United States Patent
Reiley (10) Patent No.: US 11,650,487 B2
(45) Date of Patent: May 16, 2023

(54) FRONT CONVERTER OPTICAL ASSEMBLY FOR CAMERA

(71) Applicant: Daniel Joseph Reiley, Burbank, CA (US)

(72) Inventor: Daniel Joseph Reiley, Burbank, CA (US)

(*) Notice: Subject to any disclaimer, the term of this patent is extended or adjusted under 35 U.S.C. 154(b) by 575 days.

(21) Appl. No.: 16/775,161

(22) Filed: Jan. 28, 2020

(65) Prior Publication Data
US 2021/0232026 A1    Jul. 29, 2021

(51) Int. Cl.
*G03B 17/56* (2021.01)
*G02B 17/08* (2006.01)

(52) U.S. Cl.
CPC ....... *G03B 17/565* (2013.01); *G02B 17/0848* (2013.01)

(58) Field of Classification Search
CPC ...... G03B 17/565; G03B 17/14; G03B 17/17; G02B 17/0848
See application file for complete search history.

(56) References Cited

U.S. PATENT DOCUMENTS

| | | | |
|---|---|---|---|
| 4,171,872 A | 10/1979 | Baker | |
| 4,566,763 A | 1/1986 | Greguss | |
| 5,309,276 A | 5/1994 | Rodgers | |
| 6,166,859 A | 12/2000 | Inuzuka et al. | |
| 10,054,774 B2 | 8/2018 | Cook | |
| 10,509,213 B1* | 12/2019 | Monari | G02B 15/163 |
| 2005/0036213 A1* | 2/2005 | Mann | G02B 17/0892 359/726 |

* cited by examiner

*Primary Examiner* — Yogesh K Aggarwal
(74) *Attorney, Agent, or Firm* — Fish & Richardson P.C.

(57) ABSTRACT

An apparatus includes multiple optical elements arranged along an optical path between an entrance aperture and an exit aperture, configured to image an object at infinity to an image at infinity and defining an exit pupil for light at the exit aperture, the image have a magnification, M, in a range from 7× to 15×. The optical elements include four non-planar mirrors. The apparatus also includes a connector configured to attach the apparatus to a mobile device having a camera with the exit pupil of the plurality of optical elements aligned with an entrance pupil of the camera of the mobile device.

26 Claims, 9 Drawing Sheets

FIG. 5

FRONT CONVERTER OPTICAL ASSEMBLY FOR CAMERA

FIELD OF THE INVENTION

The invention relates to optical assemblies and more particularly to front converter optical assemblies for a cameras.

BACKGROUND

Front converter lenses are afocal attachments to the object side of photographic lenses; they are used to modify the field of view of a prime lens. Historically, front converter lenses found wide acceptance because they economically added functionality to photographers' large investment in fixed focal length lenses. Front converters have also allowed a quick change in field of view without removing the lens or changing focus. Front converters have also been used as anamorphic attachments for cinematography. However, most functions of front converters were better achieved using zoom lenses, so front converters fell out of favor as the performance of zoom lenses improved.

In recent years, however, the wide adoption of smart phones that include high quality cameras has re-opened the market for front converter lenses. As with front converters from years ago, these new lens attachments add functionality to owners' large investment in smart phones and other mobile devices, which generally have fixed focal length lenses.

SUMMARY

In general, in one aspect, the invention features an apparatus that includes multiple optical elements arranged along an optical path between an entrance aperture and an exit aperture, the optical elements being configured to image an object at infinity to an image at infinity and defining an exit pupil for light at the exit aperture, the image have a magnification, M, in a range from 7× to 15×. The optical elements include: a first mirror having a first non-planar reflecting surface, the first mirror being arranged along the optical path to receive light entering the apparatus through the entrance aperture; a second mirror having a second non-planar reflecting surface, the second mirror being arranged along the optical path to receive light reflected from the first non-planar reflecting surface of the first mirror; a third mirror having a third non-planar reflecting surface, the third mirror being arranged along the optical path to receive light reflected from the second non-planar reflecting surface of the second mirror; and a fourth mirror having a fourth non-planar reflecting surface, the fourth mirror being arranged along the optical path to receive light reflected from the third non-planar reflecting surface of the third mirror and reflect the light towards the exit aperture. The apparatus also includes a connector configured to attach the apparatus to a mobile device having a camera with the exit pupil of the plurality of optical elements aligned with an entrance pupil of the camera of the mobile device.

Embodiments of the apparatus can include one or more of the following features. The example, the first, second, third, and fourth mirrors are each formed a single piece of optical material. The optical path from the entrance aperture of the apparatus to the exit aperture of the apparatus can be through the single piece of optical material. The optical material can be a plastic material or an organic glass.

In some embodiments, the first and third mirrors are formed on a first piece of material and the second and fourth mirrors are formed on a second piece of material separate from the first piece of material. The optical path between the first and fourth mirrors can be through air.

The optical elements can include at least one refractive, optically powered element. A first of the at least one refractive, optically powered elements can be arranged in the optical path at the entrance aperture of the apparatus.

At least one of the first through fourth non-planar reflecting surfaces can be aspherical surfaces. For example, each of the first through fourth non-planar reflecting surfaces are aspherical surfaces. At least one of the aspherical surfaces can be a free-form asphere. For example, each of the first through fourth non-planar reflecting surfaces are free-form aspheres.

M can be 10×, 11×, or 12×.

The entrance aperture of the apparatus can be on a different side of the apparatus from the exit surface of the apparatus. The entrance aperture can be perpendicular to the exit surface of the apparatus. The entrance aperture of the apparatus can be on an opposite side of the apparatus from the exit surface of the apparatus. The entrance aperture of the apparatus can be parallel to the exit surface of the apparatus.

A diameter of the exit pupil can match a diameter of the entrance pupil of the camera of the mobile device.

An edge spread function of the apparatus can correspond to about five pixels or less of the camera of the mobile device. For example, the edge spread function of the apparatus corresponds to about two pixels or less of the camera of the mobile device.

The optical assembly can have a volume of 1,000 cm$^3$ or less.

The connector can include a clamp.

The optical elements can have a field of view of 20 degrees or more at the exit aperture.

The optical elements can form an intermediate image between the entrance aperture and the exit aperture.

The optical elements can include two positive mirrors.

The optical elements can include one negative mirror.

Among other advantages, embodiments of the apparatus can include providing a form factor for a magnifying front converter lens for a camera of a mobile device that is compact and provides high quality imaging at high magnification.

Other aspects of the invention and other advantages will be apparent from the description below.

BRIEF DESCRIPTION OF THE DRAWINGS

In the figures, like symbols indicate like elements.

DETAILED DESCRIPTION

Figure 1:
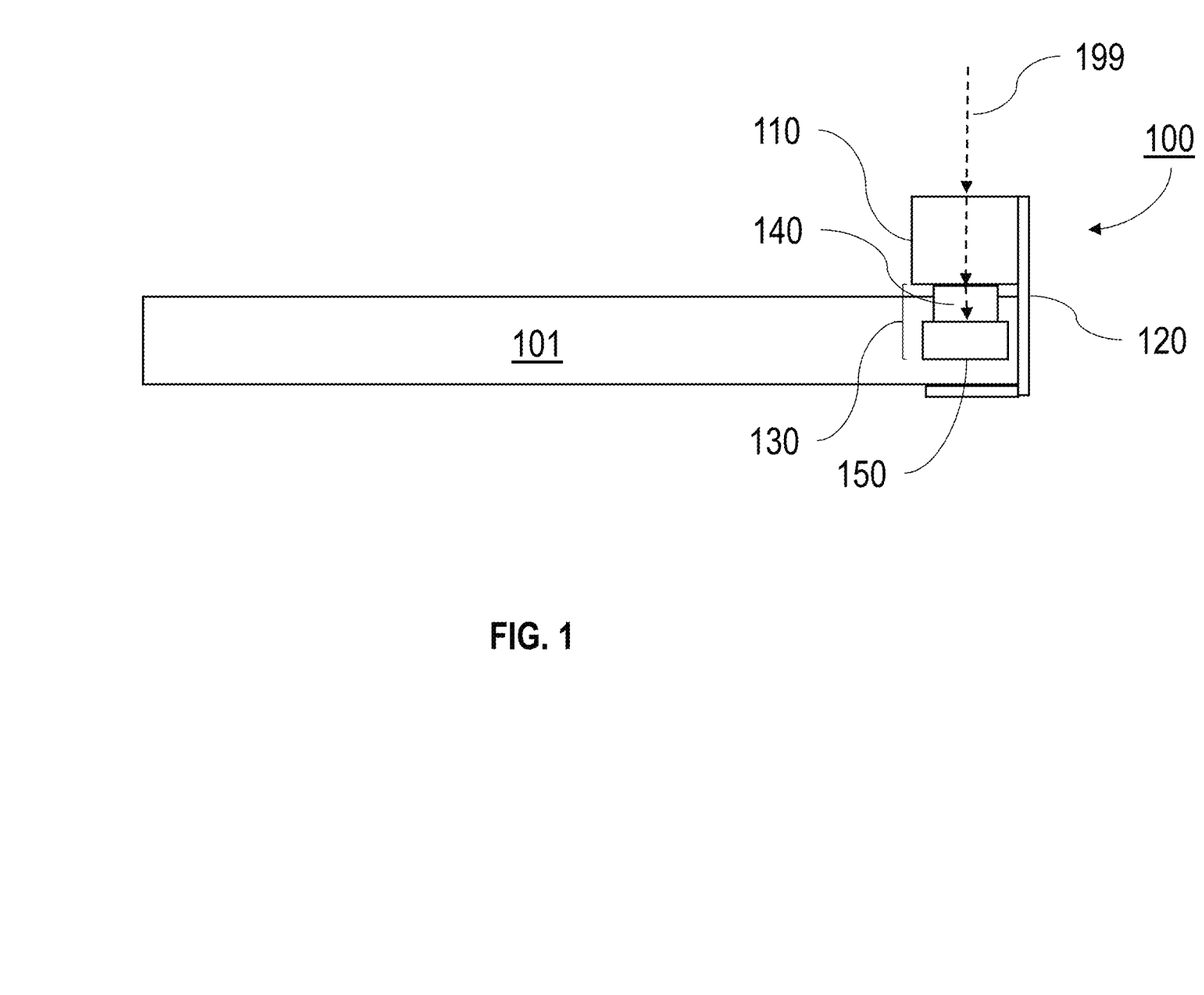
FIG. 1 is a schematic diagram showing an example of a front converter lens attached to a mobile phone.

Referring to FIG. 1, a front converter lens 100 is mounted on a mobile phone 101 with a camera 130. Camera 130 includes a lens 140 and a sensor 150. Typically, lens 140 has an axis of symmetry and an entrance pupil, where the entrance pupil having a diameter, $D_1$.

Converter lens 100 includes an afocal optical assembly 110 (e.g., composed of mirrors and/or lens elements) and a clamp 120 (or other attachment device) that secures converter lens 100 to mobile phone 101, positioning optical assembly 110 appropriately relative to the phone's camera 130. The optical elements of converter lens 100 define an optical path from an entrance aperture to an exit aperture. Optical assembly 110 receives light 199 from an object and directs the light to camera 130. The path can be free of obscurations, which can provide high light transmission through the converter lens and/or good bokeh for images acquired using the converter lens. Generally, optical assembly 110 is characterized by an exit pupil, which has a diameter $D_2$. Typically, $D_2$ is greater than or equal to the entrance pupil of camera 130 $D_{31}$. Also, the exit pupil location matches the location of the entrance pupil of camera 130. The exit pupil's diameter, $D_2$, can be relatively small (e.g., 5 mm or less, 4 mm or less, 3 mm or less, such as 2 mm to 5 mm). $D_1$ can be related to D2 by a factor of the magnification, M, of converter lens 100, i.e., $D_1 = M*D_2$.

In embodiments, converter lens 100 includes at least two positive mirrors and at least one negative mirror. It is believe that two (or more) positive mirrors are useful to create an afocal system. One (or more) negative mirrors may be useful to correct for field curvature.

Converter lens 100 can have a relatively large field of view. For example, embodiments of the converter lens can have a field of view on the exit side of 20 degrees or more (e.g., 25 degrees or more, 30 degrees or more, e.g., up to 40 degrees). The field of view can be determined as the angle between light headed to one corner of the image and light headed to the opposite corner of the image. The field of view can be determined using optical design software. In some implementations, the field of view on the entrance side (FOCen) approximately differs from the field of view on the exit side (FOCex) by a factor of the magnification, M, i.e., M*FOVen=FOVex.

Converter lens 100 can form one or more intermediate images. Forming intermediate images can improve image quality of the final image. For example, including at least one intermediate image in the path can provide the ability for an optical designer to correct aberrations across the image surface.

In some embodiments, clamp 120 has a spring force that ensures that camera lens 140 entrance pupil is coplanar with the exit pupil of converter lens 100. Clamp 120 can also have a lateral reference surface to ensure that the camera lens 140 entrance pupil is in the same location as the exit pupil of converter lens 100.

Optical assembly 110 is contained in a housing that protects the mirrors and/or lens elements from the environment and from impact, such as impact that results from drops. In some embodiments, one or more of the optical elements can include fiducial surfaces for aligning the optical element(s) within the housing, aligning the optical element(s) relative to each other, and/or aligning the optical element(s) relative to the entrance and/or exit apertures of the assembly. For example, one or more of the optical elements can be formed to be larger than what is optically required. The housing can include mechanical mounting surfaces that contact the precision surface of the optical element at a location where it is not optically used, thereby providing mechanical positioning for the optical element relative to the housing.

Front converter lens 100 modifies the field of view of camera 130 by afocally magnifying images formed by the camera. Generally, the magnification can vary depending on the design, but magnification ratios of 7× to 15× are possible for example. Converter lens 100 can magnify the image with high image quality. For example, front converter lens can provide a magnification of 7× or more (e.g., 10× or more, 12× or more, such as 15×) with an edge-spread function (ESF) of 12 pixels or less e.g., 10 pixels or less, 8 pixels or less, 5 pixels or less, 3 pixels or less, 2 pixels or less, such as about 1.5 pixels).

Two specific design examples are described below, but generally, converter lens 100 provides a high degree of image magnification at high image quality in a relatively compact form factor. For instance, use of multiple (e.g., four) optically powered mirrors can be used to fold the optical path of the assembly, providing a compact size. In some embodiments, for example, converter lens 100 can have volume of 1,000 $cm^3$ or less (e.g., 900 $cm^3$ or less, 800 $cm^3$ or less, 700 $cm^3$ or less, 600 $cm^3$ or less, 500 $cm^3$ or less, such as as little as 200 $cm^3$). In certain cases, converter lens 100 can have a largest edge of 10 cm or less (e.g., 80 mm or less, 60 mm or less, 50 mm or less, 40 mm or less, 30 mm or less).

A first example optical assembly 200 for a front converter lens is shown in FIGS. 2A-2D. Light enters optical assembly 200 via an entrance lens 210 and exits the optical assembly via an exit lens 220. Optical assembly 200 includes, in order of the light path from entrance lens 210 to exit lens 220, a first mirror M12, a second mirror M22, a third mirror M32, and a fourth mirror M42. According to the specified radius of curvature of each optical element, entrance lens 210 has a convex, aspheric surface. Mirror M12 is a concave mirror, mirror M22 is a convex mirror, mirror 32 is a convex mirror, and mirror M42 is a concave mirror. Exit lens 220 has no optical power (e.g., it has a flat surface), which is believed to reduce chromatic aberration.

FIGS. 2A-2D show the path of rays at infinite conjugates through the optical assembly. The assembly, which is afocal, reduces the diameter of the incoming ray bundle by an amount corresponding to the magnification of the system. The light path is unobscured. Optical assembly 200 forms a single intermediate image 12.

The mirror diameters are adapted to the beam shape. Specifically, mirrors M12 and M22 have a substantially circular perimeter, while mirrors M32 and M42 have a rectangular perimeter. Other shapes are possible provided they provide an optical surface that includes the beam profile.

Figure 2A:
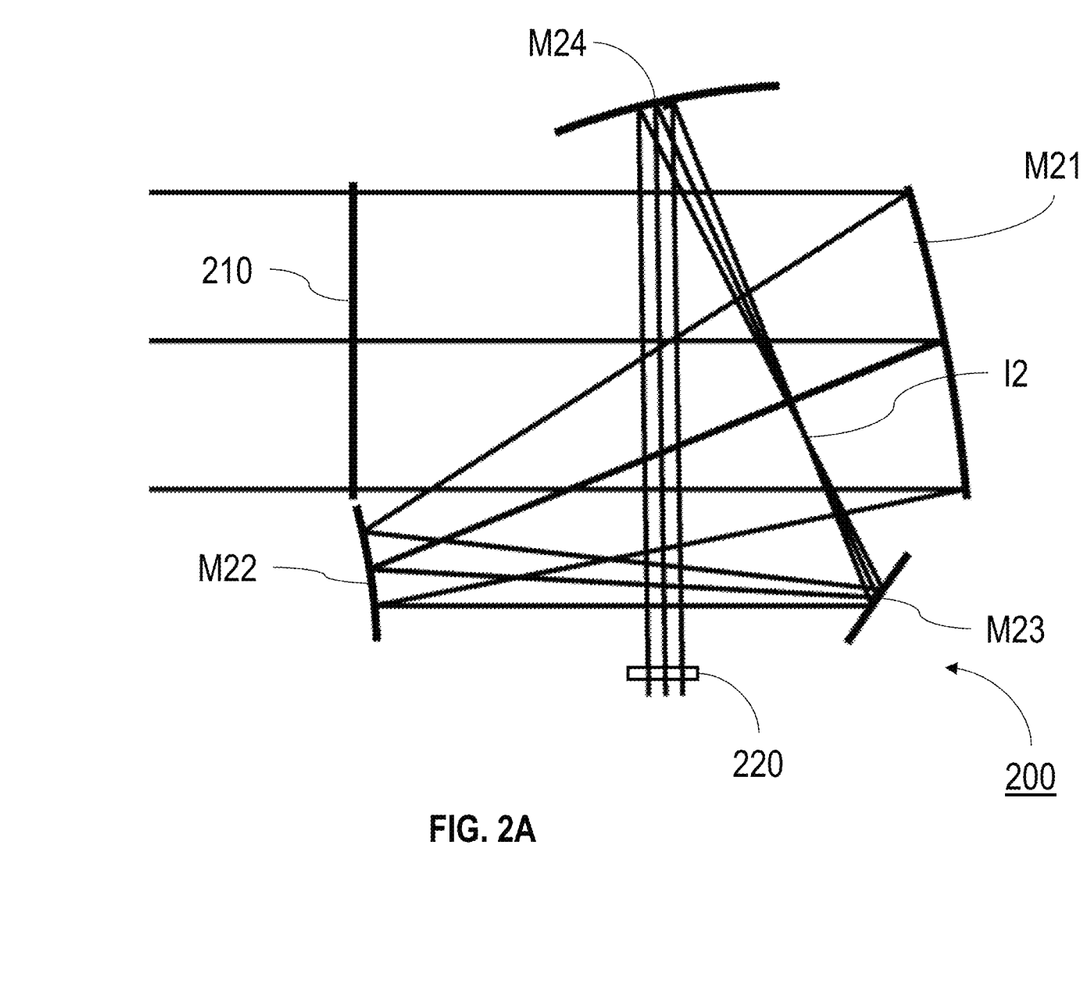
FIG. 2A is a sectional view of an optical layout of a first example of a front converter lens for a mobile phone.
Figure 2B:
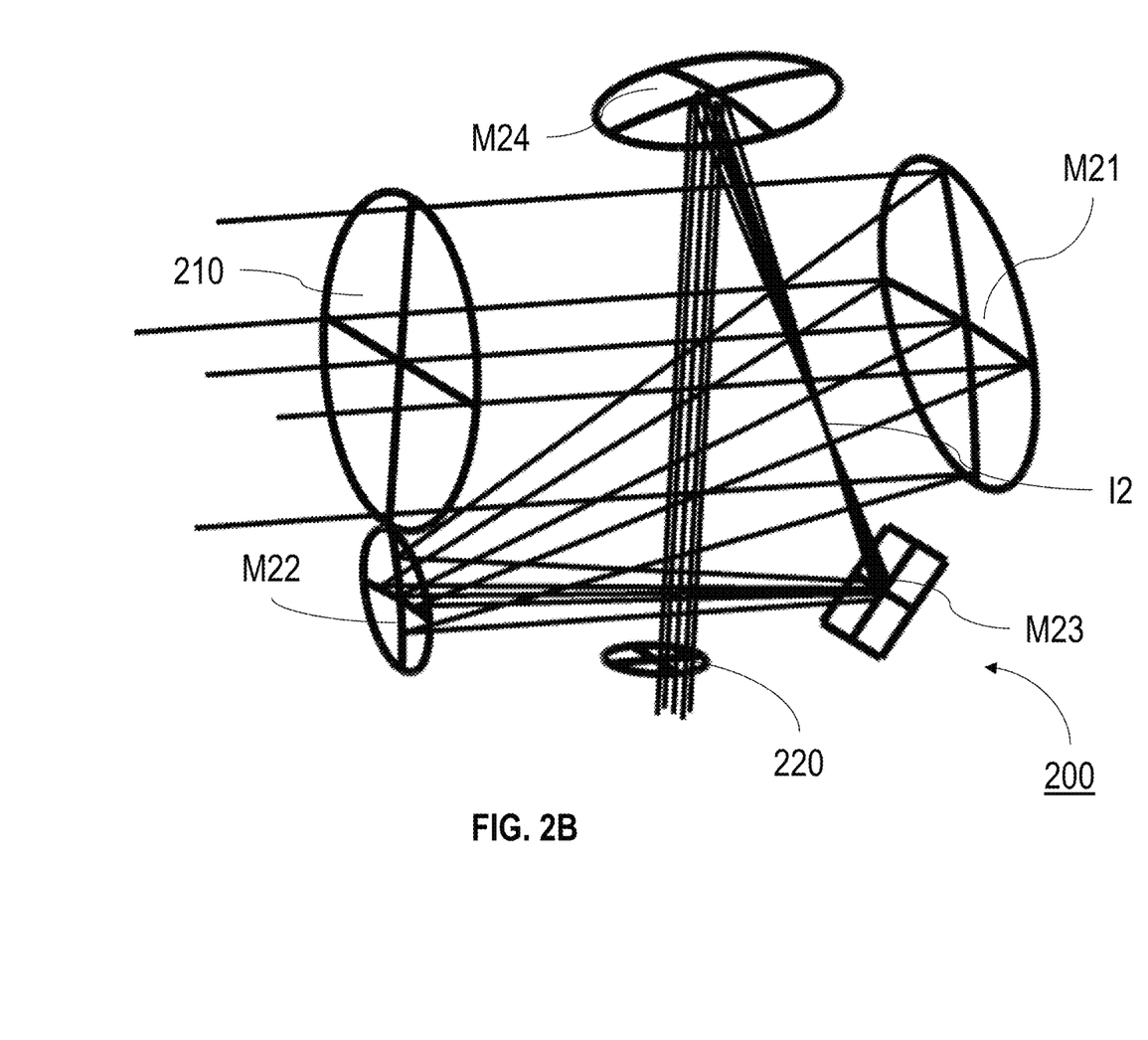
FIG. 2B is an isometric view of the optical layout of the front converter lens shown in FIG. 2A.
Figure 2C:
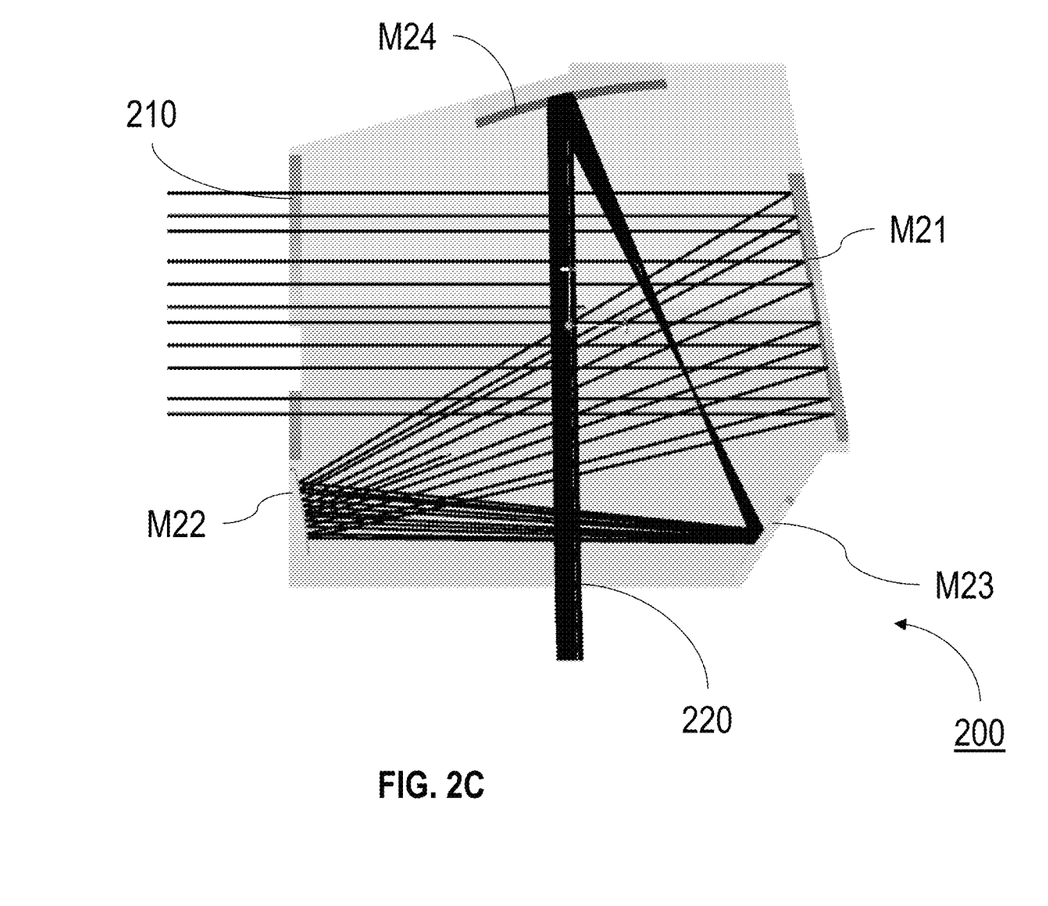
FIG. 2C is a sectional view of the front converter lens shown in FIGS. 2A and 2B, illustrating the location of the optical elements in a monolithic piece of optical material.
Figure 2D:
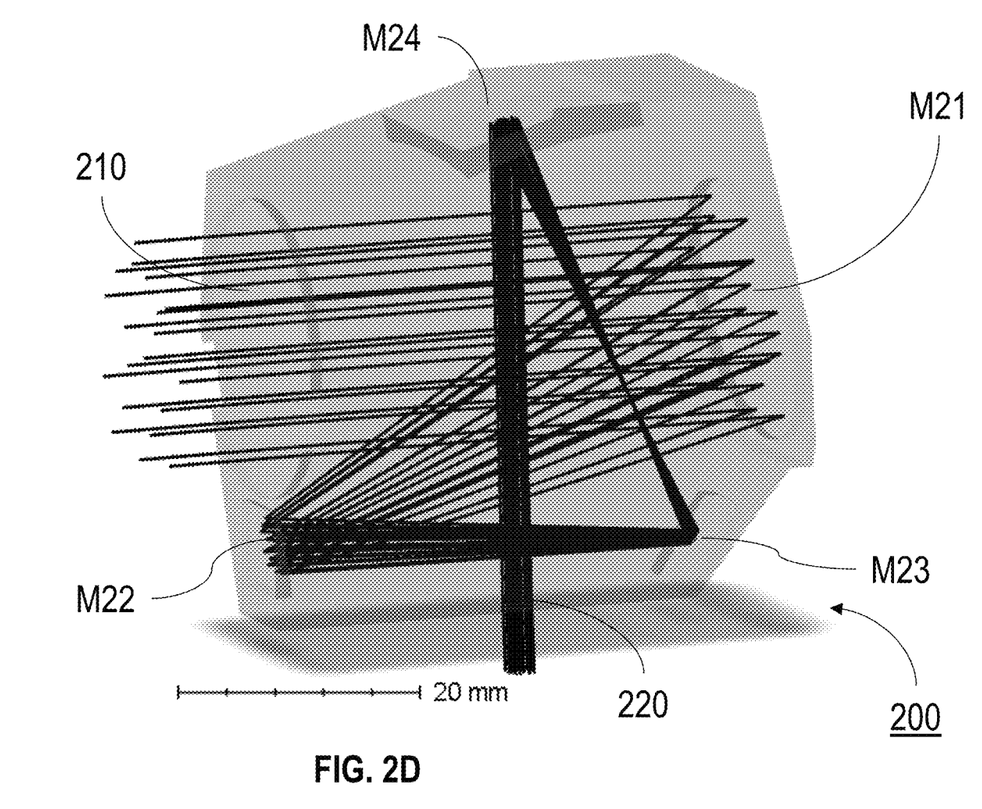
FIG. 2D is an isometric view of the front converter lens shown in FIG. 2C.

Optical assembly 200 is formed from a monolithic piece of optical material, which is illustrated in FIGS. 2C and 2D, specifically. Generally, transparent optical materials with low chromatic aberration and low absorption across the visible spectrum can be used. For example, transparent plastic materials (e.g., cyclic olefin copolymers (COC) or polycarbonate) or inorganic glasses (e.g., silica based glasses) can be used. Some of the mirrors, e.g., mirror M22 and/or mirror 24 can be made slightly larger than optically necessary in order to provide mechanical reference surfaces for mounting and alignment.

Details of the layout of optical assembly 200 are provided in Tables 1-3 below, which specify the shape, spacing, and alignment of the optical elements in the optical assembly. Optical assembly has an entrance aperture of 21.77 mm and angular field of view of 3 degrees×4 degrees at the entrance aperture. The exit aperture is 2.2 mm, which matches the entrance aperture of an iPhone lens. The field of view on the exit side is 40 degrees. The entrance pupil is located at mirror M21 and the exit pupil is located at exit lens 220. The mirrors are even asphere surfaces, as defined in Zemax Optic Studio. Generally, this design and the design below can be scaled to match different entrance aperture sizes.

TABLE 1

| Surf | Type | Radius | Thickness | Glass | Conic |
|---|---|---|---|---|---|
| OBJ | STANDARD | Infinity | Infinity | | 0 |
| 1 (210) | EVENASPH | 34296.68 | 43.54002 | COC | −1.661152e+07 |
| STO | STANDARD | Infinity | 1.248177e−07 | COC | 0 |
| 3 | COORDBRK | — | 2.113171 | | — |
| 4 (M12) | EVENASPH | −115.3481 | −43.92006 | MIRROR | −0.8123371 |
| 5 | COORDBRK | — | 0 | | — |
| 6 (M22) | EVENASPH | −38.24283 | 0 | MIRROR | 8.244643 |
| 7 | COORDBRK | — | 30.82545 | | — |
| 8 | COORDBRK | — | 0 | | — |
| 9 (M32) | EVENASPH | 381.7696 | 0 | MIRROR | −2411.391 |
| 10 | COORDBRK | — | −42.14474 | | — |
| 11 | COORDBRK | — | 0 | | — |
| 12 (M42) | EVENASPH | 54.49615 | 0 | MIRROR | −0.560189 |
| 13 | COORDBRK | — | 40.8533 | | — |
| 14 | COORDBRK | — | 0 | | — |
| 15 (220) | PARAXIAL | | 6 | | — |
| 16 | STANDARD | Infinity | 0 | | 0 |
| IMA | STANDARD | Infinity | | | 0 |

TABLE 1 lists the radius of curvature (column 3), the thickness in mm (column 4), the type of material (column 5), and the conic constant (column 6) for surfaces 1 through 16. Note that Surface 1 corresponding to entrance lens 210, Surface 4 corresponds to mirror M12, Surface 6 corresponds to mirror M22, surface 9 corresponds to mirror M32, and surface 12 corresponds to mirror M42. Surface 15 corresponds to exit lens 220. OBJ and IMA refer to the axial locations of the object and image, respectively. The remaining surfaces are not physical surfaces of the optical assembly.

TABLE 2

| Coefficient | S1 | S4 | S6 | S9 | S12 |
|---|---|---|---|---|---|
| r^4 | 8.8223391e−09 | 3.2922969e−08 | 3.8639682e−05 | 8.8240169e−06 | −6.814047e−07 |
| r^6 | −1.1328319e−11 | −2.0072773e−13 | −1.3585854e−07 | −3.6209093e−08 | 3.6879818e−09 |
| r^8 | −5.8077129e−13 | −3.7398833e−15 | 1.8877534e−09 | 1.1000884e−10 | 7.8987628e−12 |
| r^10 | −1.0952999e−15 | 1.404132e−18 | −2.5241216e−12 | −1.3578863e−13 | −9.4896877e−14 |

TABLE 2 gives the aspheric coefficients for surfaces S1, S4, S6, S9, and S12, respectively.

TABLE 3

| x | S3 | S5 | S7 | S8 | S10 | S11 | S13 | S14 |
|---|---|---|---|---|---|---|---|---|
| Decenter Y (mm) | −22.1168 | 0.5783 | −0.5783 | −5.9617 | 5.9617 | 6.3426 | −6.3426 | −12.967 |
| Tilt about X (deg) | | −2.4267 | 2.4267 | 32.0153 | 32.0153 | 14.1461 | −14.146 | 24.9825 |

TABLE 3 gives the values, in mm and degrees, respectively, for the Y-axis decentration of relevant surfaces and the tilt about the X-axis for those same surfaces.

Figure 3:
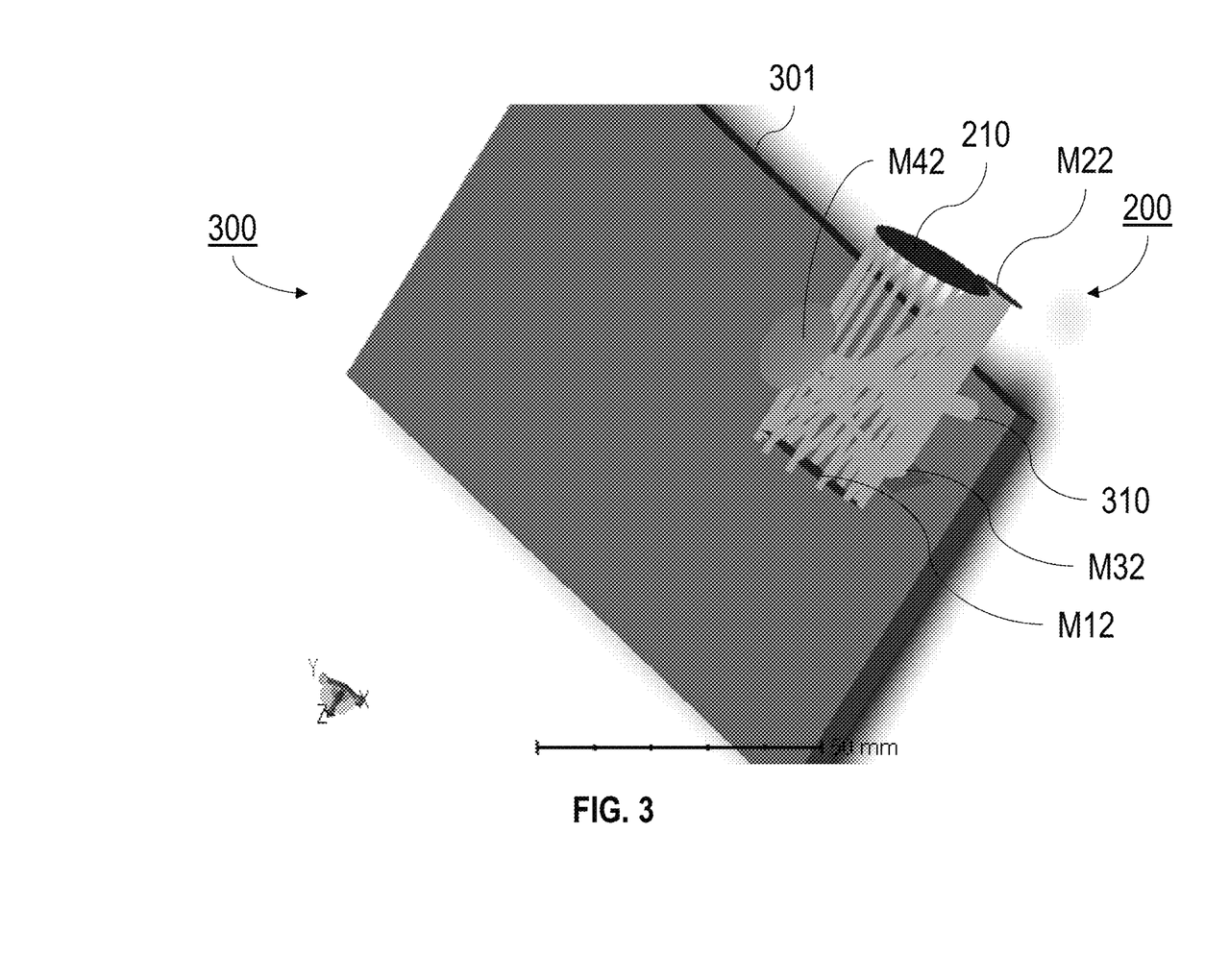
FIG. 3 is an isometric view of the first example of the front converter lens attached to a mobile phone.

Referring to FIG. 3, optical assembly 200 is shown positioned relative to a camera 310 of a mobile phone 300. As is evident from the diagram, entrance lens 210 faces in the direction of a side edge 301 of phone 300. A 50 mm scale is provided for reference.

While the foregoing embodiment features an optical assembly in which the optical path of the light is folded so that the entrance aperture is positioned on a surface that is on an adjacent, orthogonal surface of the exit aperture, other implementations are also possible. For example, referring to FIGS. 4A and 4B, another example optical assembly 400 includes entrance and exit apertures located on opposite sides of the assembly. A scale is provided for reference.

Figure 4A:
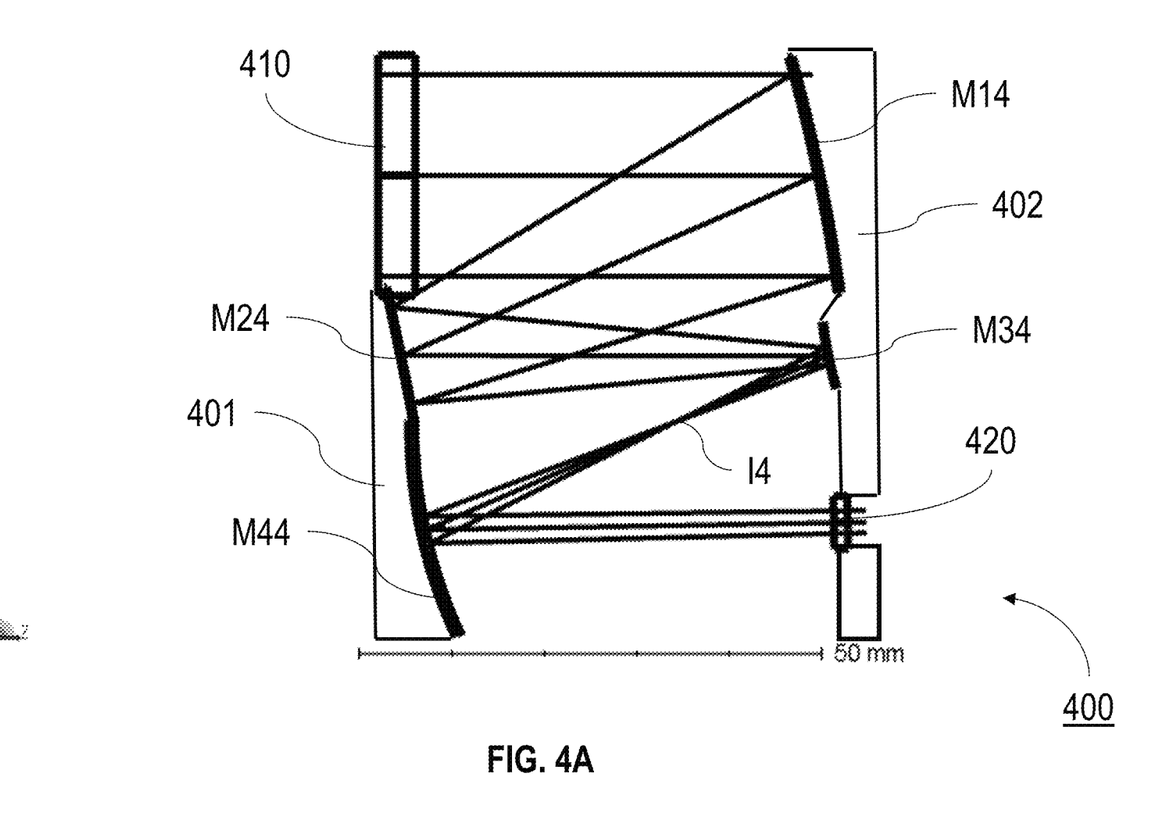
FIG. 4A is a sectional view of an optical layout of a second example of a front converter lens.
Figure 4B:
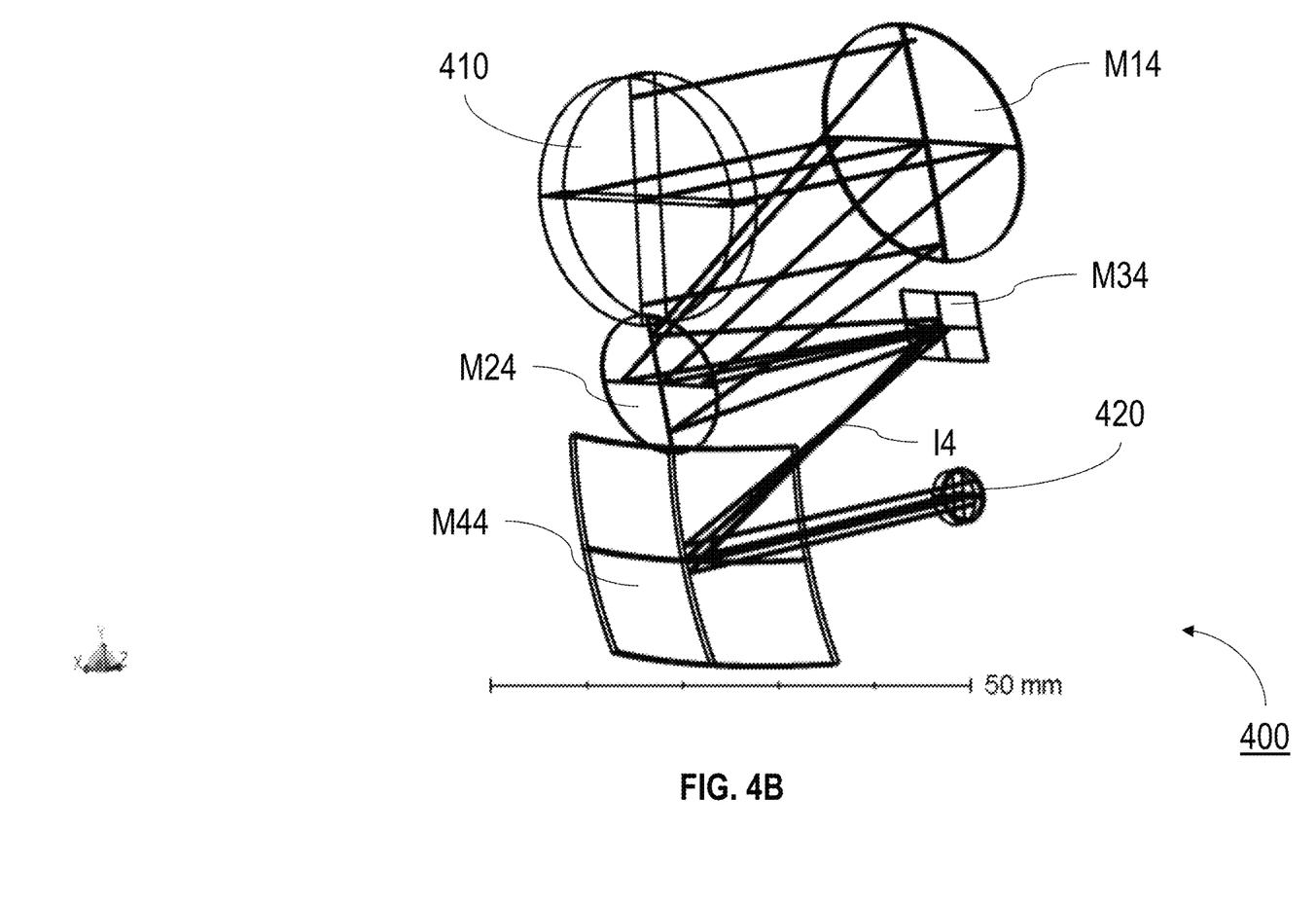
FIG. 4B is an isometric view of the optical layout of the front converter lens shown in FIG. 4A.

In particular, optical assembly 400 includes an entrance lens 410 and an exit lens 420, and four mirrors M14, M24, M34, and M44, arranged in order of the light path from the entrance lens to the exit lens. The light path is unobscured. Each of the mirrors is optically powered, being Zernike sag surfaces, as defined in Zemax Optic Studio, being freeform aspheres without rotational symmetry. Based on their specified radius of curvature of the mirror surfaces (see below), M14 is a concave mirror, M24 is a convex mirror, M34 is convex, and M34 is concave.

Entrance lens 410 and mirrors M24 and M44 are supported on a common substrate 401 and exit lens 420 and mirrors M14 and M34 are supported on another common substrate 402. This ensures that the relative arrangements of entrance lens 410 and mirrors M24 and M44, on the one hand, and exit lens 420 and mirrors M14 and M34 on the other hand, are rigidly fixed and stable. Substrates 401 and 402 are held in place relative to each other by a rigid mounting (not shown), which maintains a relative orientation and separation between the two substrates accurately positioning the optical elements of the assembly as specified by the design layout. Optical assembly 400 forms an intermediate image 14 in the light path.

The mirror diameters are adapted to the beam shape. Specifically, mirrors M14 and M24 have a substantially circular perimeter, while mirrors M34 and M44 have a rectangular perimeter. Other shapes are possible provided they provide an optical surface that includes the beam profile.

Details of the layout of optical assembly 400 are provided in Tables 4-6 below, which specify the shape, spacing, and alignment of the optical elements in the optical assembly. Like assembly 200, optical assembly 400 has an entrance aperture of 21.77 mm and angular field of view of 3 degrees×4 degrees at the entrance. The assembly has a field of view of 40 degrees at the exit side. The exit aperture is 2.2 mm. The entrance pupil is located at mirror M14 and the exit pupil is located at lens 420.

TABLE 4

| Surf | Type | Radius | Thickness | Glass |
| --- | --- | --- | --- | --- |
| OBJ | STANDARD | Infinity | Infinity | |
| 1 | STANDARD | Infinity | 4 | COC |
| 2 | SZERNSAG | Infinity | 43 | |
| STO | STANDARD | Infinity | 0.0002543694 | |
| 4 | COORDBRK | — | 0.388807 | |
| 5 (M14) | SZERNSAG | −190.0122 | 0 | MIRROR |
| 6 | COORDBRK | — | −48.84449 | |
| 7 | COORDBRK | — | 0 | |
| 8 (M24) | FZERNSAG | −467.8174 | 0 | MIRROR |
| 9 | COORDBRK | — | 45.9461 | |
| 10 | COORDBRK | — | 0 | |
| 11 (M34) | SZERNSAG | 43.74801 | 0 | MIRROR |
| 12 | COORDBRK | — | −47.18385 | |
| 13 | COORDBRK | — | 0 | |
| 14 (M44) | SZERNSAG | 53.85185 | 0 | MIRROR |
| 15 | OORDBRK | — | 44.04234 | |
| 16 | STANDARD | Infinity | 1.5 | COC |
| 17 | STANDARD | Infinity | 2 | |
| 18 | PARAXIAL | — | 6 | |
| IMA | STANDARD | Infinity | | |

TABLE 4 lists the radius of curvature (column 3), the thickness in mm (column 4), and the type of material (column 5) for surfaces 1 through 18. Note that Surfaces 1 and 2 correspond to entrance lens 410, Surface 5 corresponds to mirror M14, Surface 8 corresponds to mirror M24, surface 11 corresponds to mirror M34, and surface 12 corresponds to mirror M44. Surface 16 and 17 correspond to exit lens 420. OBJ and IMA refer to the axial locations of the object and image, respectively. The remaining surfaces are not physical surfaces of the optical assembly.

TABLE 5

| | S5 | S8 | S11 | S14 |
| --- | --- | --- | --- | --- |
| Normalization Radius | 11.5 | 8 | 6 | 20 |
| Zernike Term 6 | −0.00052970641 | −0.00057623394 | −0.00026185087 | 1.9420362e−05 |
| Zernike Term 7 | −4.7087442e−06 | −0.00087668421 | −5.2479502e−05 | 0.00095580028 |
| Zernike Term 9 | −8.4929628e−05 | 0.0012357752 | −0.00031707348 | 0.0020810761 |
| Zernike Term 11 | −5.4703198e−05 | 0.0012230442 | −6.2172659e−05 | −0.00068947896 |
| Zernike Term 12 | −6.6288996e−05 | 0.0003799786 | 0.0012601232 | 2.4956238e−05 |
| Zernike Term 14 | −0.00015823613 | −0.0019967532 | 2.1233188e−05 | −4.1267214e−05 |
| Zernike Term 17 | 1.4460601e−05 | −0.00052662971 | −5.8375026e−05 | 0.00048411707 |
| Zernike Term 19 | −3.0703568e−05 | −0.0011446411 | 0.00016227523 | −0.0011107885 |
| Zernike Term 21 | 0.00011462388 | −0.00058000395 | 0.00025863669 | −0.00049192185 |
| Zernike Term 22 | −2.4836164e−05 | −2.7142623e−05 | 4.5494477e−05 | 1.656873e−05 |
| Zernike Term 24 | −2.8104178e−05 | −9.7409621e−05 | −1.7738021e−05 | −3.7227946e−05 |
| Zernike Term 26 | −2.4661667e−05 | 0.0011831401 | −3.2947409e−05 | 2.0243738e−05 |
| Zernike Term 28 | −8.8212751e−05 | 0.0002312379 | 2.4257566e−05 | 2.5351784e−06 |
| Zernike Term 29 | −1.1973296e−05 | 0.00029751651 | 4.5405888e−05 | −0.0001504112 |
| Zernike Term 31 | −2.1644604e−05 | −0.00064526838 | −0.00017236408 | 0.00057749892 |
| Zernike Term 33 | 2.0288199e−05 | −1.3714142e−05 | −0.00015402003 | 0.00036653944 |
| | −3.0076356e−05 | | | 2.837724e−05 |
| | −1.8583662e−05 | | | −4.4060572e−05 |

TABLE 5 gives the aspheric coefficients for surfaces S1, S4, S6, S9, and S12, respectively.

TABLE 6

| | S4 | S6 | S7 | S9 | S10 | S12 | S13 | S15 |
|---|---|---|---|---|---|---|---|---|
| Tilt About X (deg) | −11.752482 | −11.752482 | 11.79613 | 11.79613 | −11.749771 | −11.749771 | 11.206709 | 11.206709 |

TABLE 6 gives the values, in mm and degrees, respectively, for the Y-axis decentration of relevant surfaces and the tilt about the X-axis for those same surfaces.

Figure 5:
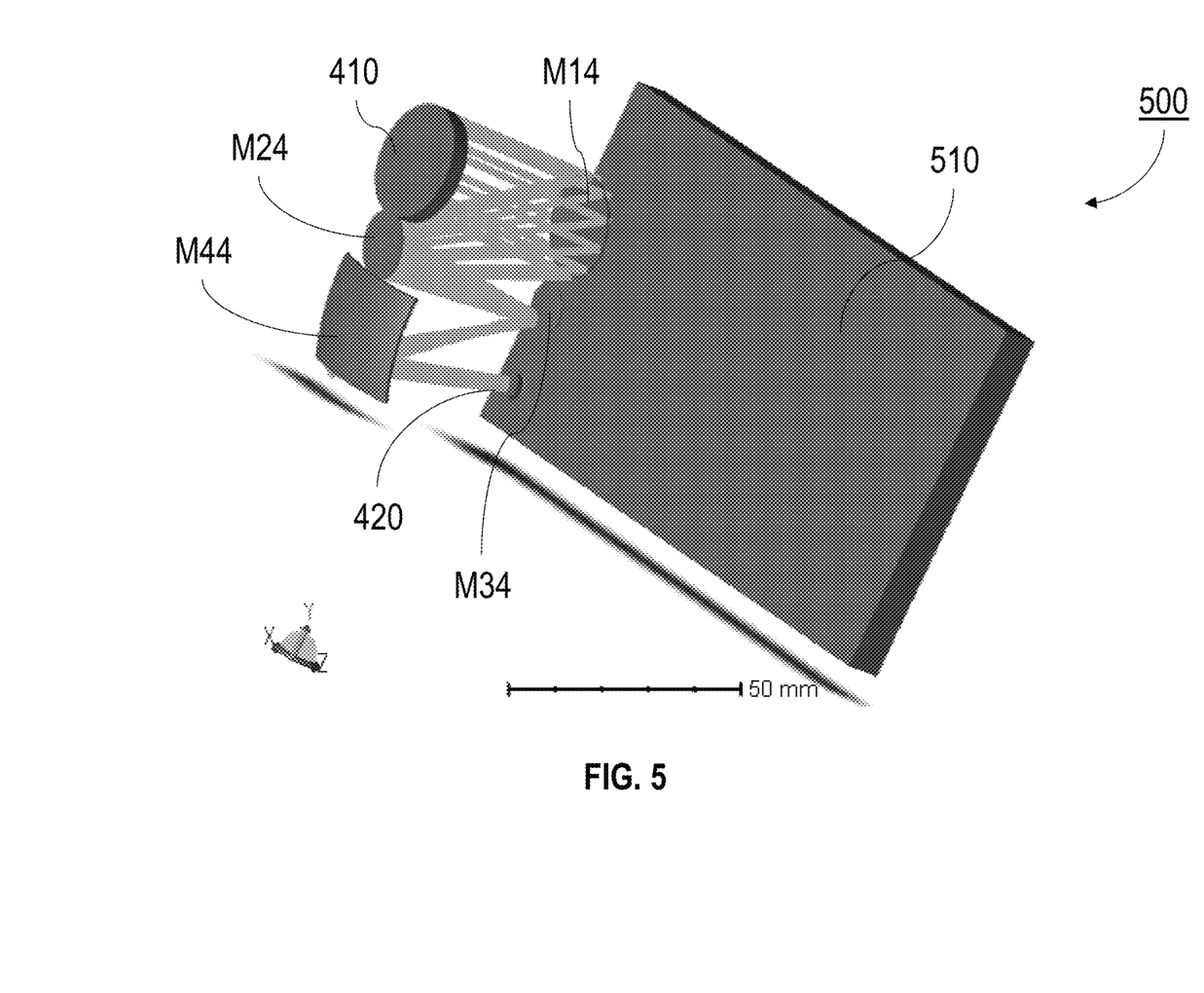
FIG. 5 is an isometric view of the second example of the front converter lens attached to a mobile phone.

Referring to FIG. 5, in use, optical assembly 400 is mounted to a mobile phone 500 with exit lens 420 aligned to the entrance aperture of phone camera 510. Entrance lens 410 faces away from a rear surface 501 of phone 500.

In general, the optical assemblies described above can be formed using a variety of appropriate manufacturing methods used to make optical components and assemblies. The reflective surfaces of the mirrors, for instance, can be formed depositing a metal onto a surface having the shape of the mirror. Suitable metals include silver or aluminum, for example. Other reflective materials, such as reflective multilayers can be used.

In some embodiments, the elements can be molded or formed using additive manufacturing techniques (e.g., 3D printing). Alternatively, or additionally, the surfaces of one or more of the optical elements can be formed by surface shaping techniques, e.g., grinding or embossing. In some embodiments, optical elements are formed on different pieces of optical material, which is then bonded or fused together to provide the optical assembly.

Generally, the optical surfaces are formed with sufficient precision to provide appropriate image quality. For example, in some embodiments, the mirror surfaces can have a RMW roughness of 4 nm or less (e.g., 3 nm or less, 2 or less). The surface roughness should be sufficiently low to keep light scattering at an appropriately low level.

In some embodiments, reference surfaces can be formed (e.g., molded) into the optical elements (e.g., adjacent the optical surfaces). Such surfaces can facilitate alignment of the optical elements relative to each other. Such reference surfaces can be used to provide a simple and inexpensive mounting mechanism.

Generally, while the two example embodiments are described above, other embodiments are also possible. For example, while the foregoing embodiments both have a magnification, M, of 10×, generally these designs can be scaled to have a magnification in a range from about 7× to about 15×.

In some embodiments, the optical assemblies can include additional optical elements. For example, in certain implementations, optical assembly 200 can include a fold mirror or prism to fold an optical axis of the assembly so that the entrance aperture is on an opposite side of the assembly from the exit aperture.

Furthermore, while the foregoing examples are described for use with mobile phones, more generally the optical designs can be applied to other imaging systems too, such as other cameras (e.g., GoPro and other action cameras, cameras in tablet computers, and so forth).

Other embodiments are in the following claims.

What is claimed is:

1. An apparatus, comprising:
    a plurality of optical elements arranged along an optical path between an entrance aperture and an exit aperture, the optical elements being configured to image an object at infinity to an image at infinity and defining an exit pupil for light at the exit aperture, the image have a magnification, M, in a range from 7× to 15×, the plurality of optical elements comprising:
        a first mirror having a first non-planar reflecting surface, the first mirror being arranged along the optical path to receive light entering the apparatus through the entrance aperture;
        a second mirror having a second non-planar reflecting surface, the second mirror being arranged along the optical path to receive light reflected from the first non-planar reflecting surface of the first mirror;
        a third mirror having a third non-planar reflecting surface, the third mirror being arranged along the optical path to receive light reflected from the second non-planar reflecting surface of the second mirror; and
        a fourth mirror having a fourth non-planar reflecting surface, the fourth mirror being arranged along the optical path to receive light reflected from the third non-planar reflecting surface of the third mirror and reflect the light towards the exit aperture; and
    a connector configured to attach the apparatus to a mobile device having a camera with the exit pupil of the plurality of optical elements aligned with an entrance pupil of the camera of the mobile device.

2. The apparatus of claim 1, wherein the first, second, third, and fourth mirrors are each formed a single piece of optical material.

3. The apparatus of claim 2, wherein the optical path from the entrance aperture of the apparatus to the exit aperture of the apparatus is through the single piece of optical material.

4. The apparatus of claim 2, wherein the optical material is a plastic material or an organic glass.

5. The apparatus of claim 1, wherein the first and third mirrors are formed on a first piece of material and the second and fourth mirrors are formed on a second piece of material separate from the first piece of material.

6. The apparatus of claim 5, wherein the optical path between the first and fourth mirrors is through air.

7. The apparatus of claim 1, wherein the plurality of optical elements comprises at least one refractive, optically powered element.

8. The apparatus of claim 7, wherein a first of the at least one refractive, optically powered elements is arranged in the optical path at the entrance aperture of the apparatus.

9. The apparatus of claim 1, wherein at least one of the first through fourth non-planar reflecting surfaces are aspherical surfaces.

10. The apparatus of claim 9, wherein each of the first through fourth non-planar reflecting surfaces are aspherical surfaces.

11. The apparatus of claim 9, wherein at least one of the aspherical surfaces is a free-form asphere.

12. The apparatus of claim 11, wherein each of the first through fourth non-planar reflecting surfaces are free-form aspheres.

13. The apparatus of claim 1, wherein M is 10×.

14. The apparatus of claim 1, wherein the entrance aperture of the apparatus is on a different side of the apparatus from the exit surface of the apparatus.

15. The apparatus of claim 14, wherein the entrance aperture of the apparatus is perpendicular to the exit surface of the apparatus.

16. The apparatus of claim 14, wherein the entrance aperture of the apparatus is on an opposite side of the apparatus from the exit surface of the apparatus.

17. The apparatus of claim 16, wherein the entrance aperture of the apparatus is parallel to the exit surface of the apparatus.

18. The apparatus of claim 1, wherein a diameter of the exit pupil of the apparatus matches a diameter of the entrance pupil of the camera of the mobile device.

19. The apparatus of claim 1, wherein an edge spread function of the apparatus corresponds to about five pixels or less of the camera of the mobile device.

20. The apparatus of claim 19, wherein the edge spread function of the apparatus corresponds to about two pixels or less of the camera of the mobile device.

21. The apparatus of claim 1, wherein the optical assembly has a volume of 1,000 cm$^3$ or less.

22. The apparatus of claim 1, wherein the connector comprises a clamp.

23. The apparatus of claim 1, wherein the optical elements have a field of view of 20 degrees or more at the exit aperture.

24. The apparatus of claim 1, wherein the optical elements form an intermediate image between the entrance aperture and the exit aperture.

25. The apparatus of claim 1, wherein the optical elements comprise two positive mirrors.

26. The apparatus of claim 1, wherein the optical elements comprise one negative mirror.

* * * * *